United States Patent

[11] 3,623,486

| [72] | Inventor | Barouh V. Berkovits<br>Newton Highlands, Mass. |
|------|----------|------------------------------------------------|
| [21] | Appl. No. | 862,695 |
| [22] | Filed | Oct. 1, 1969 |
| [45] | Patented | Nov. 30, 1971 |
| [73] | Assignee | American Optical Corporation<br>Southbridge, Mass. |

[54] DOUBLE RATE DEMAND PACEMAKER
8 Claims, 4 Drawing Figs.

[52] U.S. Cl. .................................................. 128/419 P,
                                                            331/129
[51] Int. Cl. .................................................. A61n 1/36
[50] Field of Search .................................... 128/419 P;
                                                331/113, 179; 307/271

[56] References Cited
UNITED STATES PATENTS

| 3,311,111 | 3/1967 | Bowers | 128/419 P |
| 3,518,997 | 7/1970 | Sessions | 128/419 P |
| 3,528,428 | 9/1970 | Berkovits | 128/419 P |

FOREIGN PATENTS

| 1,444,363 | 3/1966 | France | 128/419 P |
| 985,797 | 3/1965 | Great Britain | 128/419 P |

Primary Examiner—William E. Kamm
Attorneys—William C. Nealon, Noble S. Williams, Robert J. Bird and Amster & Rothstein ABSTRACT: A double rate demand pacer having a bistable magnetic reed switch connected to an RC charging circuit for selectively short-circuiting one of two series-connected resistors. The pacer can be switched between two rates dependent upon the polarity of a magnetic pole brought into its vicinity. A monostable magnetic reed switch is also incorporated in the circuit. A magnetic field of either polarity operates the monostable magnetic reed switch to place the pacer in the continuous mode; as soon as the magnetic field is removed, the pacer reverts to the demand mode with the rate being determined by the polarity of the last-applied magnetic field.

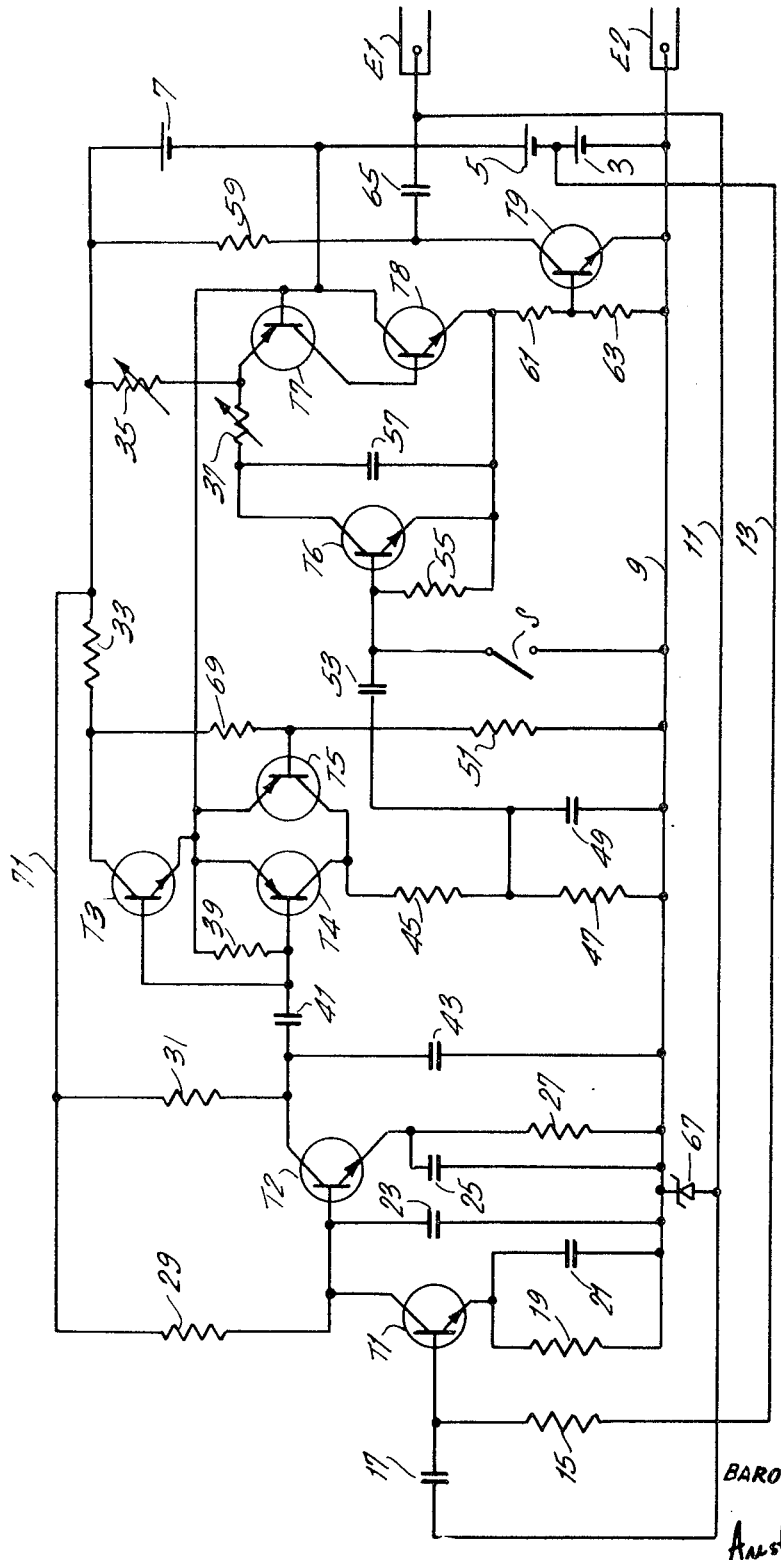

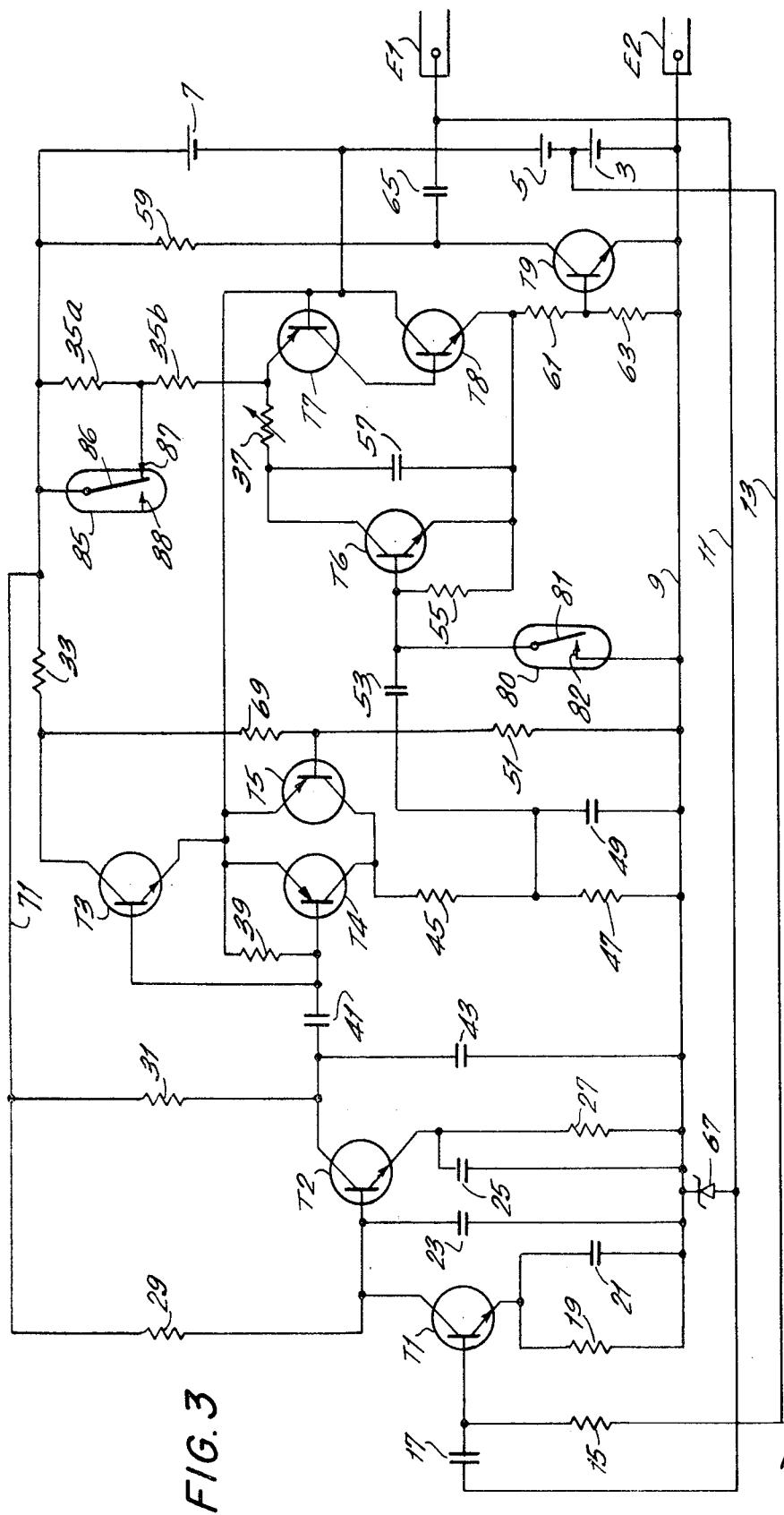

DOUBLE RATE DEMAND PACEMAKER

This invention relates to pacers, and more particularly to demand pacers whose rate of operation can be adjusted after implantation in a patient.

Early pacers generally operated continuously at a fixed rate. Following the use of this type of pacer for many years, the demand pacer was introduced. In a demand pacer, electrical heart-stimulating impulses are provided only in the absence of natural heartbeats. If only a single natural heartbeat is absent, only a single electrical impulse is generated, If more than one natural heartbeat is missing, an equal number of electrical impulses will be provided. No matter how many electrical stimuli are generated, they occur at essentially the same time spacing from each other and from previous natural heartbeats—as would be the case if they were all natural heartbeats. The result is an overall "integrated" operation, i.e., a mutually exclusive cooperation of natural heartbeats and stimulating impulses. The demand pacer of this type is disclosed in my U.S. Pat. No. 3,345,990 issued on Oct. 10, 1967.

Generally, a demand pacer is primed to generate an impulse at a predetermined time after the last natural heartbeat. If another natural heartbeat occurs during the timing interval of the pacer, an impulse is not generated and the timing period starts all over again. On the other hand, if a natural heartbeat does not take place by the end of the timing period s a stimulating impulse is generated. For the proper operation of a demand pacer, the pacer circuitry must determine if a natural heartbeat has occurred. The largest magnitude electrical signal generated by the heart activity is the QRS complex corresponding to a ventricular contraction. To determine whether a natural heartbeat has occurred, an electrode is generally coupled to a ventricle. Since in most cases ventricular stimulation is required, the same electrode can be used for both stimulating the ventricles and detecting a natural heartbeat, as disclosed in my aforesaid patent.

In the presence of noise, erroneous operation of a demand pacer of this type can take place. The noise may result in the generation of an electrical signal on the ventricular electrode, and the pacer circuitry may treat this noise as indicative of a natural heartbeat and inhibit the generation of a stimulating impulse even if one is required. In my copending application, Ser. No. 727,129 filed on Apr. 11, 1968 which has matured into U.S. Pat. No. 528,428, an improved demand pacer is disclosed. In this improved demand pacer, in the presence of the noise the pacer timing period is not interrupted. Continuous stimulating impulses are generated even if they are not required. It is better to provide an impulse even if it is not required than it is not to provide an impulse if it is required.

In the pacer disclosed in my copending application, there is a single switch and two potentiometers which can be manually adjusted to change the pacer operation. Depending on the setting of the switch, the pacer operates in either a continuous mode or a demand mode. The first potentiometer controls the width of each generated pulse. The second potentiometer controls the interpulse interval. If the switch and the potentiometers cannot be adjusted after they are implanted in the patient, it is apparent that the pacer can operate in only one of the two possible modes, and with only a single pulse width and only a single interpulse interval.

In some demand pacers marketed in recent years there is provision for switching between the continuous and demand modes of operation without requiring access to the pacer after it is implanted. The switch described above consists of a monostable magnetic reed. When a magnetic pole of either polarity is placed adjacent to the patient's chest, the reed is closed and the pacer operates in the continuous mode. When the magnet is removed, the reed opens and the pacer functions in the demand mode. One of the most important reasons for switching to the continuous mode is to allow the physician to check the pacer operation. If the patient's heart is beating normally, no pulses are generated by the pacer. Even if the patient is monitored by an electrocardiographic machine, there is no way to determine that the pacer is still functional—if the patient's heart is beating normally, there are no pacer pulses in the EGG signal. However, when the magnet controls the closing of the reed switch, the pacer pulses appear in the EGG signal and the physician can determine that the pacer is still functional and will pulse properly if and when it is required to do so.

It is a general object of my invention to provide a demand pacer which, in addition to being switched to the continuous mode of operation under control of an external magnet, is capable of operating two different rates which can also be switched under control of an external magnet.

In most demand pacers, the interpulse interval is determined by an RC timing circuit. A capacitor charges from a voltage source through a resistor, the charging rate being dependent upon the magnitude of the resistor. In the illustrative embodiment of my invention, instead of using a single resistor for this purpose, two resistors connected in series are incorporated in the charging circuit. A bistable magnetic reed is connected in parallel across a first one of the two resistors. When the reed is in a first state, this first resistor is short-circuited and the effective charging resistance is dependent upon the magnitude of only the second resistor. When the reed is in a second state, the first resistor is no longer short-circuited and the charging resistance depends upon the magnitudes of both resistors. If the north pole of a magnet is placed adjacent to the chest of the patient the reed switches to one state, and if the south pole of the magnet is placed adjacent to the chest of the patient the reed switches to the other state.

The prior art monostable magnetic reed is also incorporated in the demand pacer of the illustrative embodiment of my invention. When a magnetic pole of either polarity is brought into the vicinity of the pacer, the monostable magnetic reed closes to switch the pacer to the continuous mode of operation. At such a time the physician can verify that the pacer is still operative. Depending upon the particular polarity of the magnetic pole, the pacer rate will be set at either one of two values. If the same magnetic pole is subsequently brought into the vicinity of the pacer, the pacer will switch to the continuous mode. But as soon as the magnet is removed, the pacer is once again placed in the demand mode and its rate will be unchanged from the previous value. Thus the provision of monostable and bistable magnetic reeds in this manner enable a magnetic pole of either polarity to place the pacer in the continuous mode, with the pacer rate being set (and remaining set even when the pacers reverts to the demand mode) at a particular value corresponding to a respective magnetic pole polarity.

It is a feature of my invention to provide in a demand pacer (with or without a monostable magnetic reed for controlling the continuous and demand modes of operation) a bistable magnetic reed for controlling the pacer rate of operation.

Further objects, features and advantages of my invention will become apparent upon consideration of the invention following detailed description in conjunction with the drawing, in which:

FIG. 1 is the same as FIG. 1 in my copending application, Ser. No. 727,129 corresponding to U.S. Pat. No. 3,528,428 and depicts a preferred demand pacer;

FIG. 2 depicts a typical electrocardiogram;

FIG. 3 depicts the illustrative embodiment of the present invention; and

FIG. 4 depicts a magnet which can be used both for switching between the continuous and demand modes of operation, and for switching between the two possible rates of operation.

Referring to the pacer of FIG. 1 electrodes E1 and E2 are implanted in the patient's heart, electrode E2 being the neutral electrode and electrode E1 being positioned to stimulate the ventricles. When switch S is open, current flows between electrodes E1 and E2 to stimulate the ventricles only when an electrical stimulus is required.

Capacitor 65 serves to provide a source of current when an impulse is required. At that time, transistor T9 conducts and the capacitor discharges through the electrodes. Capacitor 57 charges through potentiometers 35 and 37 until the voltage across it causes transistors T7 and T8 to conduct. At that time, capacitor 57 discharges through transistors T7 and T8, transistor T9 conducts, and an impulse is delivered to the patient's heart from capacitor 65. The setting of potentiometer 37 controls the time taken for capacitor 57 to discharge, that is, the width of each impulse. The setting of potentiometer 35 (along with the setting of potentiometer 37) controls the time required for capacitor 57 to charge to that level which causes conduction in transistors T7 and T8, that is, the interpulse interval. Ordinarily, in the absence of conduction of transition T6, capacitor 57 would continuously charge and discharge, and impulses would be supplied to the patient's heart at fixed intervals determined by the setting of the potentiometers.

Electrode E1 is coupled over conductor 11 to the base of transistor T1. A typical ECG. trace is shown in FIG. 2, and transistors T1 and T2 conduct when electrode E1 detects a ventricular contraction which results in the generation of an R wave. (Excessive signals are shorted through Zener diode 67 to prevent damage to transistor T1.) With conduction of these transistors, a positive pulse is delivered to the base of transistor T6. Transistor T6 turns on and capacitor 57 discharges through it. Thus although the capacitor was previously charging to the level which would have resulted in the generation of an impulse, it is discharged and a new timing interval begins. This arrangement insures that an impulse is not generated if a natural heartbeat has occurred. The timing interval is such that impulses are generated with an interpulse interval slightly in excess of the desired natural interbeat interval. Only if a natural heartbeat is missing is a stimulating impulse generated.

The remaining transistors in the circuit serve to prevent conduction of transistor T6 in the presence of noise. In the presence of noise it would otherwise be possible for transistor T6 to conduct and prevent the generation of an impulse even though one is required. For this reason, when the pacer detects extraneous noise, transistor T6 is prevented from operating and impulses are delivered at a fixed rate. A more complete description of the operation of the circuit of FIG. 1 is set forth in my above-identified application.

With switch S open, the pacer operates in the demand mode as just described, However, with switch S closed, the base of transistor T6 is held at the potential of conductor 9. In such a case, pulses transmitted through capacitor 53 do not turn on the transistor. Capacitor 57 is not discharged through transistor T6 and each time the capacitor voltage rises to the point where transistors T7 and T8 conduct, a stimulating pulse is generated. The pacer thus operates in the continuous mode.

In the illustrative embodiment of my invention shown in FIG. 3, the switch S is replaced by a monostable magnetic reed switch. The switch includes a contact 82 and a reed 81, both encased in glass enclosure 80. Such a monostable magnetic reed switch has been used in pacers for several years. When either pole of magnet 89 (FIG. 4) is brought into the vicinity of the monostable magnetic reed switch, reed 81 engages contact 82. (The reed is also a contact element.) As long as the magnet is held in position, the base of transistor T6 is shorted through the reed switch to conductor 9 and the pacer operates in the continuous mode. As soon as the magnet is removed, the switch opens and the pacer reverts to the demand mode of operation.

The departure of the present invention from the prior art is the substitution of series-connected resistors 35a, 35b for resistor 35 of FIG. 1, and the placing of a bistable magnetic reed switch in parallel with resistor 35a. The bistable magnetic reed switch include two contacts 87, 88, and a reed 86, all contained within glass enclosure 85. In the case of a bistable magnetic switch, once the reed engages either contact it remains there unless an oppositely directed magnetic force causes it to switch to the other contact. For example, if the north pole of magnet 89, when placed adjacent to the chest of a patient, causes reed 86 to switch to contact 87, the reed will remain engaged with this contact even after the magnet is removed. Only when the south pole of the magnet is brought into the vicinity of the switch does the reed switch to contact 88. The reed remains engaged with contact 88 even after the magnet is removed—until the north pole of the magnet switches the reed once again at such a time that it is necessary to do so.

Contact 88 is not connected to any other circuitry. With reed 86 connected to contact 88, the short circuit across resistor 35a is removed. The charging resistance (in addition to potentiometer 37) is the sum of the impedances of resistor 35a and resistor 35b. With reed 86 connected to contact 87, as shown, resistor 35a is short-circuited, and the only charging resistance is the impedance of resistor 35b (in addition to potentiometer 37). It is thus apparent that by short-circuiting resistor 35a, a reduced time constant is obtained—which in turn results in a shorter interpulse interval. Once either of the two possible rates is selected, the pacer continues to operate at this rate until the opposite polarity magnetic pole face causes the reed switch to change states.

It should be noted that the prior art magnet and monostable reed switch can still be used as in the past. The physician can verify that the pacer is still operational if the electrocardiogram of the patient shows that the pacer has switched to the continuous mode of operation when the magnet has been brought into the vicinity of the patient's chest. However, with the provision of the additional bistable magnetic reed switch, the same magnet can also be used to control the pacer to operate at either one of two different rates. As soon as the magnet is brought into the vicinity of the pacer, reed 81 engages contact 82 and the pacer starts to function in the continuous mode. At the same time, reed 86 is either left in its previous position, or switches to engage the other contact. The electrocardiogram of the patient reflects a pacer rate dependent upon the particular orientation of the magnet. As soon as the magnet is removed, the pacer reverts to the demand mode of operation. But the basic interpulse timing interval (rate) remains at that value observed on the electrocardiogram when the magnet was placed opposite the patient's chest.

Although the invention has been described with reference to a particular embodiment, it is to be understood that this embodiment is merely illustrative of the application of the principles of the invention. For example, instead of placing two resistors in series, with the bistable magnetic reed switch in parallel with one of them, it is possible to place the two resistors in parallel, with the bistable magnet reed switch in series with one of the resistors. In such a case, when the switch is closed, both resistors will be in a the circuit and the faster of the two pacer rates will be selected. When the switch is open, only one of the resistors will be in the circuit and the pacer rate will be slower. Thus, it is to be understood that numerous modifications may be made in the illustrative embodiment of the invention and other arrangements may be devised without departing from the spirit and scope of the invention.

What is claimed is:

1. A demand pacer comprising terminal means for connection to a patient's heart, pulse-generating means for applying periodic pulses to said terminal means, means for detecting the natural beating of said patient's heart and in response thereto for inhibiting the generation of the next pulse which would otherwise be generated by said pulse-generating means, circuit means including bistable magnetic reed switch means connected to said pulse-generating means for controlling said pulse-generating means to operate at a particular one of two possible rates in accordance with the state of said bistable magnetic reed switch means, and monostable magnetic reed switch means for selectively preventing the inhibiting of the operation of said pulse-generating means.

2. A pacer in accordance with claim 1 wherein said monostable magnetic reed switch means includes a pair of normally open contacts which can be held closed only in the presence of a magnetic field, and said bistable magnetic reed switch means includes a pair of contacts which can be opened or closed in the presence of magnetic or fields of respective opposite polarities and remain open or closed after the magnetic fields are removed.

3. A pacer in accordance with claim 2 wherein said circuit means includes an RC charging circuit having two resistors connected in series, said bistable magnetic reed switch means being connected in parallel across one of said two resistors.

4. A pacer in accordance with claim 1 wherein said monostable magnetic reed switch means includes a pair of contacts normally in a first state and responsive to the continued presence of a magnetic field to being held in a second state, and said bistable magnetic reed switch means includes a pair of contacts which can be opened or closed in the presence of magnetic fields of respective opposite polarities and remain open or closed after the magnetic fields are removed.

5. A pacer in accordance with claim 4 wherein said circuit means includes an RC charging circuit having two connected resistors, said bistable magnetic reed switch means being connected to change the combined impedance of said two resistors dependent upon the state of said bistable magnetic reed switch means.

6. A pacer in accordance with claim 1 wherein said circuit means includes an RC charging circuit having two connected resistors, said bistable magnetic reed switch means being connected to change the combined impedance of said two resistors dependent upon the state of said bistable magnetic reed switch means.

7. A pacer in accordance with claim 6 wherein said two resistors are connected in series and said bistable magnetic reed switch means is connected in parallel across one of said two resistors.

8. A demand pacer in accordance with claim 1 said pulse-generating means further including timing circuit means for establishing intervals between said pulses, said timing circuit means controlled by said bistable magnetic reed switch means.

* * * * *